United States Patent
Kephart et al.

(10) Patent No.: US 11,434,373 B2
(45) Date of Patent: *Sep. 6, 2022

(54) FORMULATIONS AND PRODUCTS TO REPLACE SINGLE-USE PLASTICS AND POLYSTYRENE WITH BIO-BENIGN MATERIALS SUCH AS AGRICULTURAL WASTES

(71) Applicant: NUTJOBS, Carmel, CA (US)

(72) Inventors: Paul Ray Kephart, Carmel, CA (US); John Warner, Wilmington, MA (US); Samuel Ellman, Somerville, MA (US)

(73) Assignee: NUTJOBS, Carmel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,643

(22) Filed: Jan. 24, 2022

(65) Prior Publication Data

US 2022/0213323 A1    Jul. 7, 2022

Related U.S. Application Data

(63) Continuation-in-part of application No. 17/360,278, filed on Jun. 28, 2021, now Pat. No. 11,230,507, which is a continuation-in-part of application No. 17/074,034, filed on Oct. 19, 2020, now Pat. No. 11,046,836.

(60) Provisional application No. 62/923,044, filed on Oct. 18, 2019.

(51) Int. Cl.
| | |
|---|---|
| *C08L 97/00* | (2006.01) |
| *C08J 3/12* | (2006.01) |
| *C08J 3/00* | (2006.01) |
| *C08J 5/18* | (2006.01) |
| *B29B 7/90* | (2006.01) |
| *B29C 48/00* | (2019.01) |
| *B29C 48/88* | (2019.01) |
| *B29C 48/08* | (2019.01) |
| *B29K 105/00* | (2006.01) |
| *B29L 7/00* | (2006.01) |

(52) U.S. Cl.
CPC .............. *C08L 97/005* (2013.01); *B29B 7/90* (2013.01); *B29C 48/022* (2019.02); *B29C 48/08* (2019.02); *B29C 48/9135* (2019.02); *C08J 3/005* (2013.01); *C08J 3/12* (2013.01); *C08J 5/18* (2013.01); *B29K 2105/0064* (2013.01); *B29K 2489/00* (2013.01); *B29L 2007/002* (2013.01); *C08J 2397/00* (2013.01); *C08J 2407/02* (2013.01)

(58) Field of Classification Search
CPC ....... C08K 11/005; C08G 63/08; C08L 67/04; C08J 2367/046; B29K 2067/046
USPC .......................................................... 523/128
See application file for complete search history.

(56) References Cited

U.S. PATENT DOCUMENTS

| | | |
|---|---|---|
| 3,983,842 A | 10/1976 | Marion et al. |
| 2002/0064495 A1 | 5/2002 | Miura et al. |
| 2015/0018183 A1 | 7/2015 | Hasumi |
| 2019/0021837 A1 | 7/2019 | MacEwan et al. |

FOREIGN PATENT DOCUMENTS

| | | | | |
|---|---|---|---|---|
| CN | 108641256 | | 5/2018 | |
| EP | 0 533 314 A2 | | 3/1993 | |
| EP | 533314 A2 | * | 3/1993 | ................ C08L 1/00 |
| WO | 2014/120417 A2 | | 8/2014 | |
| WO | 2019/113520 A1 | | 6/2019 | |
| WO | WO-2019113520 A1 | * | 6/2019 | ......... B65D 21/0209 |

OTHER PUBLICATIONS

International Search Report of International Application No. PCT/US20/56334, dated Dec. 7, 2020.
Torrefaction. BTG Biomass Technology Group BV, [retrieved on Dec. 4, 2020]. Retrieved from the Internet <URL: https://www.btgworld.com/en/rtd/technologies/torrefaction >.
Derwent of CN 108641256 (Year: 2018).

* cited by examiner

*Primary Examiner* — Doris L Lee
(74) *Attorney, Agent, or Firm* — Polsinelli PC

(57) ABSTRACT

The present invention provides methods for preparing the nut waste sheet composites from a nut waste component and one or more binders.

15 Claims, 6 Drawing Sheets

FORMULATIONS AND PRODUCTS TO REPLACE SINGLE-USE PLASTICS AND POLYSTYRENE WITH BIO-BENIGN MATERIALS SUCH AS AGRICULTURAL WASTES

CROSS REFERENCE TO RELATED APPLICATIONS

The present application is a continuation in part application of U.S. patent application Ser. No. 17/360,278, filed on Jun 28, 2021, which is a continuation in part application of U.S. patent application Ser. No. 17/074,034, filed on Oct. 19, 2020, which claims the benefit of U.S. Provisional Application No. 62/923,044, filed on Nov. 18, 2019, entitled, "FORMULATIONS AND PRODUCTS TO REPLACE SINGLE-USE PLASTICS AND POLYSTYRENE WITH BIO-BENIGN MATERIALS SUCH AS AGRICULTURAL WASTES," which is hereby incorporated by reference.

FIELD OF THE INVENTION

The present disclosure generally relates to cured nut waste sheet composites comprising a nut waste component and one or more binders which are extruded, molded, or thermoformed into a sheet form.

BACKGROUND OF THE INVENTION

Plastic products have been shown to not only pollute the environment through their production but also do not appreciably degrade. Products such as Styrofoam, plastic grocery bags, plastic bottles, and plastic six pack ring carriers for soda and beer cans have been documented which adversely affects wildlife, wildlife habitat, and human life. Plastic pollution can afflict land, waterways, and oceans. It is estimated that 1.1 to 8.8 million tons of plastic waste enters the ocean from coastal communities each year. Living organisms, particularly marine animals, can be harmed either by mechanical effects, such as entanglement in plastic objects, problems related to ingestion of plastic waste, or through exposure to chemicals within plastics that interfere with their physiology. Effects on humans include disruption of various hormonal mechanisms. As of 2018, about 380 million tons of plastics are produced worldwide each year. From the 1950s up to 2018, an estimated 6.3 billion tons of plastic have been produced worldwide, of which an estimated 9% has been recycled and another 12% has been incinerated. Even though plastics can be recycled, their rate of biodegradability is considered low.

Nut wastes, shells, hulls, and nut enclosures, from nuts are generally incinerated or discarded. This waste not only places a burden on the environment but also wastes a large amount of useable resources. This waste is considered a biomass and can be used in products which environmentally friendly and reduce the pollution in the environment.

As an example, California produces an estimated 80% of the world's almond nuts. During the 2013-2014 crop year, nut growers produced approximately 7 billion pounds of almond nut almond fruit (drupe) resulting in 2 billion pounds of almond nuts, 4 billion pounds of almond hulls, and 1 billion pounds of almond shells. Most of these almond nut shells and almond hulls were sold as cattle feed, used in fuel for boilers and power generation, and used in gardening and landscaping. With the increasing emphasis on climate change and burning of fossil fuels, the use of nut shells and nut hulls in boilers and power generation is diminishing. However, a sizable fraction of these almond shells and almond hulls were sent to landfills. Thus, an important resource in the almond nut almond shells and hulls were wasted.

Other culinary nuts and non-culinary nuts face the same fate as the almonds. The drupes or fruit are removed, leaving the hull, shell, nut enclosure, or a combination of these as a waste.

Customers of these plastic products have requested new, ecofriendly products. These products would not leave a lasting footprint on the environment. Some of these products, such as cups, are now made solely of paper.

What is needed is an environmentally friendly product which can be used to replace plastic products and have increased biodegradability for a variety of products.

FIGURES

FIG. 1, FIG. 2, FIG. 3, and FIG. 4 are graphical representations of various pots produced using the nut waste composite.

SUMMARY OF THE INVENTION

Figure 1:
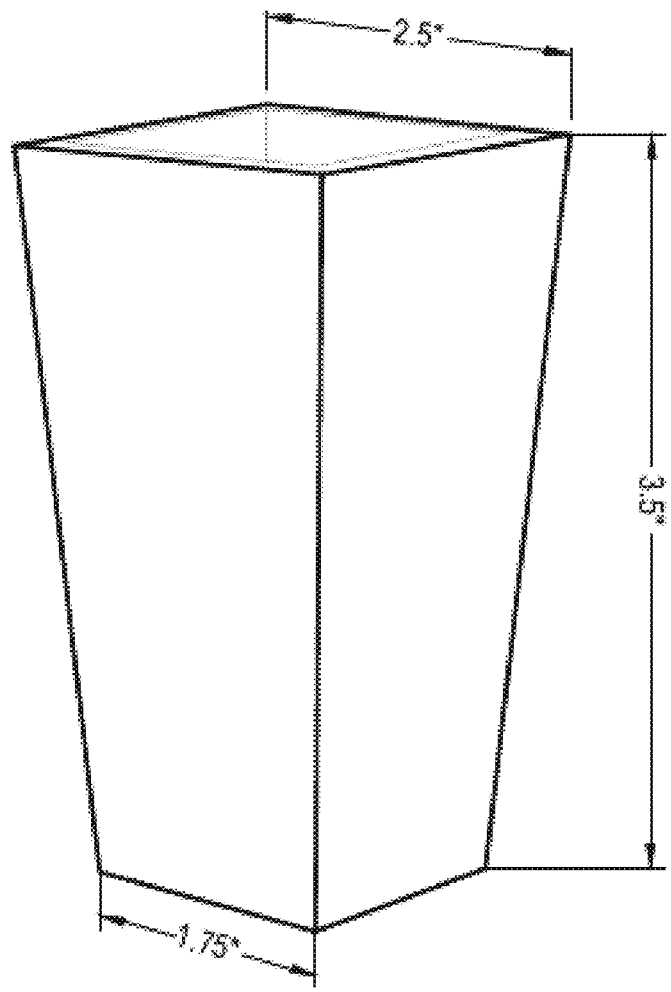
Figure 2:
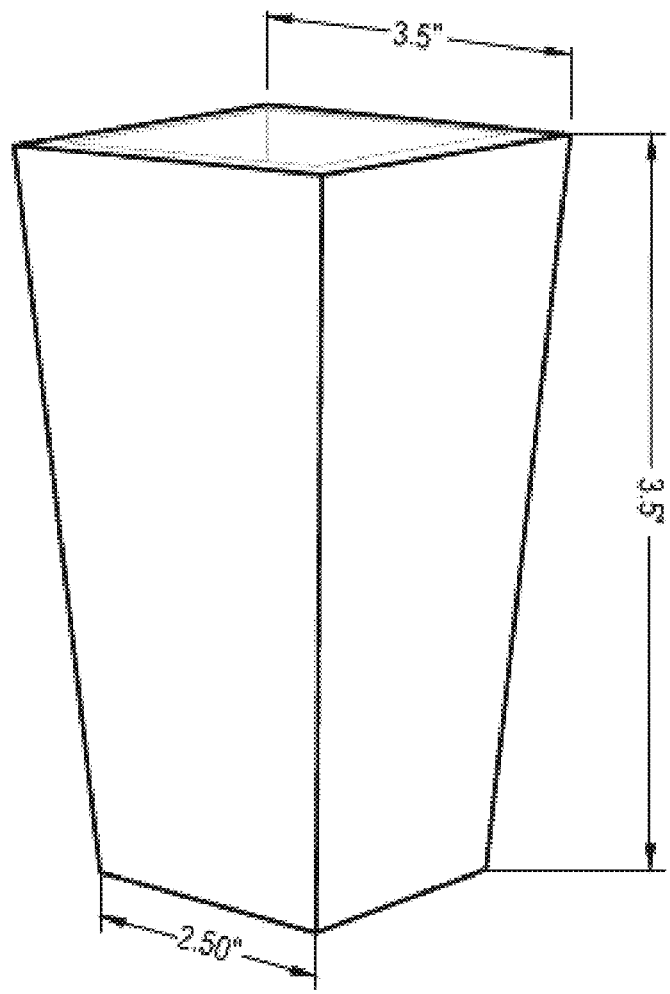
Figure 3:
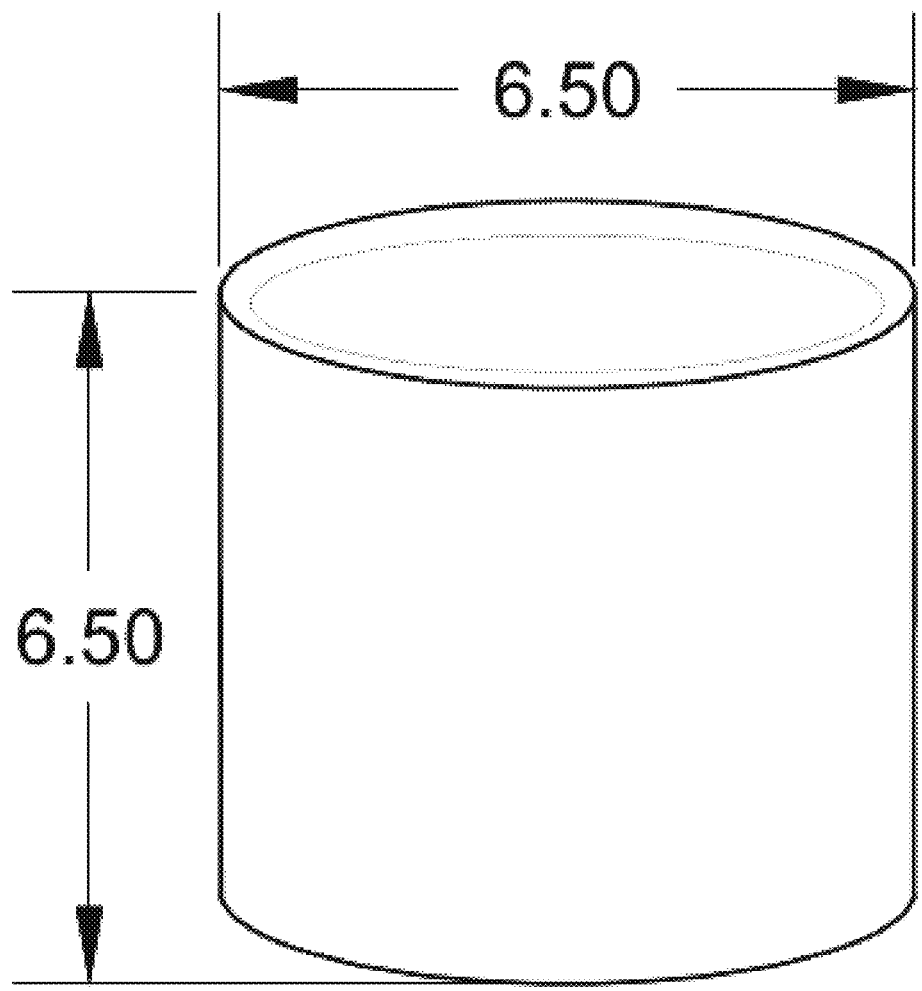
Figure 4:
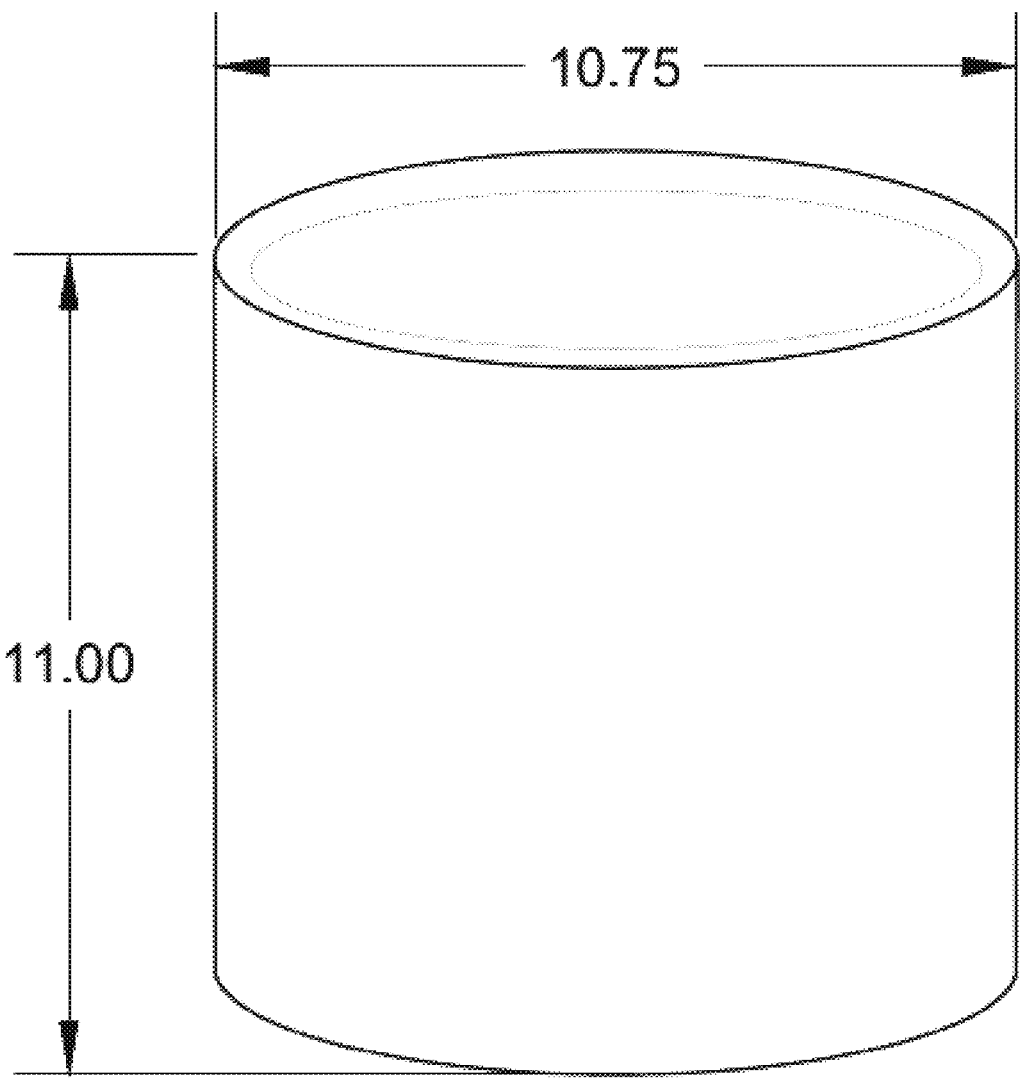

One aspect, as disclosed herein, are cured nut waste sheet composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 μm to less than about 1000 μm; (d) contacting about 5 wt% to 40 wt% of the nut waste component from step (c) with 60.0 to 95.0 wt% one or binder selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof; (d) heating the mixture to a temperature from about 80° C. to about 180° C. for about 5 minutes; (e) extruding the heated mixture into a sheet form; and (f) cooling the sheet.

Another aspect, as disclosed herein, are cured nut waste sheet composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 μm; to less than about 1000 μm; (d) contacting about 40 wt% to 70 wt% of the nut waste component from step (c) with 30.0 to 60.0 wt% of at least one or more binders selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof; (e) heating the mixture to a temperature from about 80° C. to about 180° C. for about 5 minutes; (f) extruding the heated mixture into a sheet form; and (g) cooling the sheet.

In yet another aspect, as disclosed herein, are cured nut waste sheet composite prepared by the following method comprising the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 µm to less than about 1000 µm; (d) contacting about 70 wt% to 95 wt% of the nut waste component from step (c) with 5.0 to 30.0 wt% of at least one or more binders selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof; (e) heating the mixture to a temperature from about 80° C. to about 180° C. for about 5 minutes; (f) extruding the heated mixture into a sheet form; and (g) cooling the sheet.

Other features and iterations of the invention are described in more detail below.

DETAILED DESCRIPTION OF THE INVENTION

Provided herein are nut waste composites of cured nut waste, methods for preparing these cured nut waste composites, and methods for utilizing these nut waste composites. Advantageously, these cured nut waste composites are low cost, environmentally friendly, biodegradable, easily manufactured, and can be formed into various shapes and sizes.

(I) Cured Nut Waste Composites

The present disclosure encompasses cured nut waste composites comprising a nut waste component and one or more binders. The cured nut waste sheet composite optionally comprises at least one fungus, at least one bacterium, or a combination of at least one fungus and at least one bacterium. After forming the cured nut waste composites, the cured nut waste composites are extruded, molded, or thermoformed into a sheet form of various thicknesses. These sheets are durable, permeable, biodegradable, and biocompostable.

(a) nut waste component in composite

The nut waste component is a by-product of removing the nut hull and nut shell from the fruit of the nut, also known as the drupe. Generally, the nut hull and nut shell are disposed of and not utilized in any significant amount in a commercial product. Generally, the nut waste component includes a nut shell, a nut hull, or a combination of a nut shell and a nut hull. In various embodiments, the nut waste component including nut shells, a nut hulls, or a combination of nut shells and nut hulls may be pre-processed before introduction into the nut waste composite.

A variety of nut shells and nut hulls may be used in the nut waste component. Generally, these nut shells and nut hulls can be derived from a variety of nuts. Non-limiting examples of these nuts may be an acorn, American beech, almond, breadfruit, candlenut, chestnuts, peanuts, hazelnuts, kola nuts, palm nuts, red bopple nuts, cashews, coconuts, hickory, pecans, Jack nuts, pistachio, walnuts, pine nuts, ginko nuts, Brazil nuts, macadamia, and paradise nut. In one embodiment, the nut shells and nut hulls are derived from an almond.

As appreciated by the skilled artisan, the nut waste component may comprise various mixtures of cellulose, hemicellulose, and lignin depending on the method of drying the nut waste component. The mixtures of cellulose, hemicellulose, and lignin provide hydroxyl and phenolic functionalities on the cellulose, hemicellulose, and lignin that cross-link with themselves and/or one or more binders. This cross-linking produces a nut waste sheet composite that provides increased strength, flexibility, and durability.

In various embodiments, the nut waste component including nut shells, a nut hulls, or a combination of nut shells and nut hulls may be a pre-processing step before introduction into the sheet composite. This pre-processing step dries the nut waste component or adjusts the pH of the nut waste component and then dries the nut waste component. Depending on the temperature of drying the nut waste component, the nut waste component may be dried; or dried and sterilized.

In general, the nut waste component has a residual moisture content of less than 0.5 wt% water. In various embodiments, the nut waste component has a residual moisture content of less than 0.5 wt% water, less than 0.4% water, less than 0.3% water, less than 0.2% water, or less than 0.1% water. In one embodiment, the nut waste component has a residual water content of less than 0.1 wt%.

The temperature at which the nut waste component was dried may range from about 100° C. to about 150° C. for a duration of time. This drying process may utilize an inert atmosphere, reduced pressure (vacuum), or a combination of an inert gas and reduced pressure. In various embodiments, the inert gas comprises helium, nitrogen, argon, or a combination thereof.

In general, the nut waste component has an adjusted pH ranging from 5.5 to 8.0 before introduction into the composite. In various embodiments, the pH of the nut waste hulls, the nut waste shells, or a combination of the nut waste hulls and nut waste shells ranges from 5.5 to 8.0, or 6.5 to 7.0.

The nut waste component has a specific size before introduction into the sheet composite. In an embodiment, the size of the nut waste component may range from about greater than 500 µm to less than about 1000 µm as verified through a No. 18 mesh sieve and a No. 35 mesh sieve. These sizes of the nut waste component provide composites that can be readily formed into various shapes, allows for increased strength of the composites, and allows the composites to be flexible.

In general, the weight percentage (wt%) of the nut waste component may range from about 5 wt% to about 95.0 wt%. In various embodiments, the wt % of the nut waste component may range from about 5 wt% to about 95.0 wt%, from about 15 wt% to about 75 wt%, or from 30 wt% to about 50 wt%. In one embodiment, the weight percentage (wt%) of the nut waste component ranges from about 70 wt% to about 95.0 wt%. In another embodiment, the weight percentage (wt%) of the nut waste component ranges from about 40 wt% to about 70 wt %. In yet another embodiment, the weight percentage (wt%) of the nut waste component ranges from about 5 wt% to about 40 wt%.

(b) binders in the nut waste composite

The nut waste composite comprises one or more binders. The one or more binders cross-link with the hydroxyl and/or phenolic functionality of the cellulose, hemicellulose, and lignin providing a more durable and flexible nut waste composite. Non-limiting examples of suitable one or more binders are selected from a group consisting of polyhydroxybutyrate (PHB), polyhydroxyalkanoate (PHA), polylactic acid (PLA), guayule, natural rubber latex, bentonite, an anionic starch, hyaluronic acid, water, triethyl citrate, and any combinations thereof. In one embodiment, the one or more binders is natural rubber latex.

Generally, the weight % (wt%) of the one or more binders in the nut waste composite may range from 5.0 wt% to about 95 wt%. In various embodiments, the wt% of the one or more binders may range from about 5.0 wt% to about 95 wt%, from about 5.0 wt% to about 15.0 wt%, from about 15 wt% to about 65 wt%, from about 30 wt% to about 50 wt%, from about 65 wt% to about 75 wt%, or from about 75.0 wt% to about 95 wt%. In one embodiment, the wt% of one or more binders ranges from about 5.0 wt% to about 30.0 wt%. In another embodiment, the wt% of one or more binders ranges from about 30 wt% to about 60 wt%. In yet another embodiment, the wt% of one or more binders ranges from about 60 wt% to about 95 wt%.

(c) optionally comprising at least one fungus, at least one bacterium, or at least one fungus and at least one bacterium The nut waste composite may optionally comprise at least one fungus, at least one bacterium, or a combination of at least one fungus and at least one bacterium. The inclusion of at least one fungus, at least one bacterium, or a combination of at least one fungus and at least one bacterium enhances the biodegradability and biocompostability of the composite after the product is prepared. Non-limiting examples of suitable fungus and bacterium may be *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

The inclusion of the optional at least one fungus, at least one bacterium, or a combination of at least one fungus and at least one bacterium may occur after the composite is prepared; after the composite is extruded, molded, or thermoformed; or after the composite is cooled into the final form.

(d) properties of the nut waste sheet composite

The cured nut waste sheet composites exhibit some beneficial and unique properties. Some of these properties are increased strength and hardness, enhanced low thermal conductivity, pliability, ease of production of the nut waste composite, and low cost. These cured nut waste sheet composites can be readily furled up and unfurled. This property of these cured nut waste sheet composites allows for additional ease of production, ease of storage, and ease of transport. These properties are unique.

Generally, the thickness of the sheets produced may range from about 1/16" or larger than about 1/16", for example 1/8" or 1/4".

In general, the cured nut waste sheet composites exhibit a percolation rate ranging from about 3.75 $Lm^{-2}s^{-1}$ to about 4.00 $Lm^{-2}s^{-1}$ for sheet composites with 2.5 mm diameter holes spaced 5 mm apart. In various embodiments, the cured nut waste sheet composites exhibit a percolation rate ranging from about 3.75 $Lm^{-2}s^{-1}$ to about 4.00 $Lm^{-2}s^{-1}$, from about 3.80 $Lm^{-2}s^{-1}$ to about 3.90 $Lm^{-2}s^{-1}$, or from about 3.82 $Lm^{-2}s^{-1}$ to about 3.88 $Lm^{-2}s^{-1}$ for sheet composites with 2.5 mm diameter holes spaced 5 mm apart. In one embodiment, the cured nut waste sheet composites exhibit a percolation rate of about 3.86 $Lm^{-2}s^{-1}$ for sheet composites with 2.5 mm diameter holes spaced 5 mm apart. Therefore, the cured nut sheet composites provide low water permeable rates.

In general, the cured nut waste sheet composites exhibit a thermal conductivity ranging from about 0.25 $Wm^{-1}K^{-1}$ to about 0.275 $Wm^{-1}K^{-1}$ at 23° C. In various embodiments, the cured nut waste sheet composites exhibit a thermal conductivity ranging from about 0.25 $Wm^{-1}K^{-1}$ to about 0.275 $Wm^{-1}K^{-1}$, from about 0.26 $Wm^{-1}K^{-1}$ to about 0.27 $Wm^{-1}K^{-1}$, or from about 0.262 $Wm^{-1}K^{-1}$ to about 0.269 $Wm^{-1}K^{-1}$ at 23° C. In one embodiment, the cured nut waste sheet composites exhibit a thermal conductivity of about 0.2685 $Wm^{-1}K^{-1}$ at 23° C. Therefore, the cured nut waste sheet composites are appropriate heat insulators.

Generally, the cured nut waste sheet composites exhibit a density from about 0.5 g/mL to about 0.75 g/mL. In various embodiments, the cured nut waste sheet composites exhibit a density from about 0.5 g/mL to about 0.75 g/mL, from about 0.55 g/mL to about 0.70 g/mL, or from about 0.6 g/mL to about 0.68 g/m L. In one embodiment, the cured nut waste sheet composites exhibit a density of about 0.68 g/mL.

In general, the cured nut waste sheet composites exhibit a Hardness from about 15 Konig to about 25 Konig. In various embodiments, the cured nut waste sheet composites exhibit a Hardness from about 15 Konig to about 25 Konig, from about 16 Konig to about 24 Konig, from about 18 Konig to about 22 Konig, or from about 19 Konig to about 21 Konig. In one embodiment, the cured nut waste sheet composites exhibit a Hardness of about 19 Konig.

Generally, the cured nut sheet composites exhibit an Ultimate Tensile Strength from about 0.5 MPa to about 0.6 MPa. In various embodiments, the cured nut sheet composites exhibit an Ultimate Tensile Strength from about 0.5 MPa to about 0.6 MPa, from about 0.52 MPa to about 0.58 mPa, or from about 0.54 mPa to about 0.56 MPa. In one embodiment, the cured nut sheet composites exhibit an Ultimate Tensile Strength of about 0.55 MPa.

In general, the cured nut sheet composites exhibit a Maximum Strain from about 263 to about 445. In various embodiments, the cured nut sheet composites exhibit a Maximum Strain from about 263 to about 445, from about 290 to about 410, or from about 330 to about 380. In an embodiment, the cured nut sheet composites exhibit a Maximum Strain of about 353.

Generally, the cured nut sheet composites exhibit an Elastic Modulus from about 0.053 MPa to about 0.057 MPa. In various embodiments, the cured nut sheet composites exhibit an Elastic Modulus from about 0.053 MPa to about 0.057 MPa, from about 0.054 MPa to about 0.056 MPa, or from 0.0545 MPa to about 0.0555 MPa. In one embodiment, the cured nut sheet composites exhibit an Elastic Modulus of about 0.055 MPa.

With the incorporation of the nut waste component, the cured nut waste sheets composites are more flexible, durable, and provide less thermally conductivity as compared to other plastic materials.

The nut waste composites produced may be formed or casted into a number of cured forms. These formed or casted forms may be further melted and reformed or recast into alternate final forms. Some non-limiting examples of suitable forms or shapes are not limited to viscous liquid resins, solid resins, pellets, flakes, disks, wafers, or ribbons. Some final forms may be a sheet or a disk.

(e) exemplary embodiments In one embodiment, the cured nut waste sheet composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 µm to less than about 1000 µm; (d) contacting about 5 wt% to 40 wt% of the nut waste component from step (c) with 60.0 to 95.0 wt% natural latex rubber (d) heating the mixture to a temperature from about 90° C. to about 120° C. for about 5 minutes; (e) extruding the heated mixture into a sheet form; and (f) cooling the sheet.

In another embodiment, the cured nut waste sheet composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 µm to less than about 1000µm; (d) contacting about 40 wt% to 70 wt% of the nut waste component from step (c) with 30.0 to 60.0 wt% of natural rubber latex; (e) heating the mixture to a temperature from about 90° C. to about 120° C. for about 5 minutes; (f) extruding the heated mixture into a sheet form; and (g) cooling the sheet.

In yet another embodiment, the cured nut waste sheet composite is prepared by the following steps: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 µm to less than about 1000 µm; (d) contacting about 70 wt% to 95 wt% of the nut waste component from step (c) with 5.0 to 30.0 wt% of natural rubber latex; (e) heating the mixture to a temperature from about 90° C. to about 120° C. for about 5 minutes; (f) extruding the heated mixture into a sheet form; and (g) cooling the sheet.

(II) Methods for Preparing the Nut Waste Sheet Composite

The present disclosure also encompasses methods for preparing the cured nut waste composite. The methods comprising: (a) providing a nut waste component selected from the group consisting of nut shells, nut hulls, and a combination of nut shells and nut hulls; (b) drying the nut waste component or adjusting the nut waste component to a pH of 5.0 to 8.0 then drying or sterilizing the nut waste component; (c) grinding the nut waste component to a size ranging from about greater than 500 µm to less than about 1000 µm; (d) contacting the nut waste component from step (c) with at least one binder selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof; (e) heating the mixture to a temperature from about 90° C. to about 120° C. for about 5 minutes; (f) extruding the heated mixture into a sheet form; and (g) cooling the sheet.

(a) providing a nut waste component

The method commences by providing a nut waste component. In one embodiment, the nut waste component is obtained from a nut processing facility. In some instances, twigs from the nut tree are removed. Thus, the nut waste component includes nut waste shells, nut waste hulls, or a combination of almond nut hulls and nut shells that may be optionally washed with water. In one embodiment, the nut waste component includes nut shells.

(b) drying the nut waste component or adjusting the pH of the nut waste component then drying the nut waste component The next step in the method consists of drying the nut waste component or adjusting the pH of the nut waste component then drying the nut waste component.

The nut waste component is dried to reduce the amount of residual water to less than 0.5 wt%. In various embodiments, the nut waste component has a residual moisture content of less than 0.5 wt% water, less than 0.4% water, less than 0.3% water, less than 0.2% water, or less than 0.1% water. In one embodiment, the nut waste component has a residual water content of less than 0.1 wt%.

The temperature for drying the nut waste component may range from about 100° C. to about 150° C. In various embodiments, the temperature of drying may range from about 100° C. to about 150° C., from about 120° C. to about 140° C., or from about 125° C. to about 130° C. An inert atmosphere, reduced pressure (vacuum), or a combination of inert atmosphere and reduced pressure may be also utilized in drying the nut waste component. The inert atmosphere may be helium, nitrogen, argon, or a combination thereof.

The duration of drying depends on the residual water content, the type of nut waste component, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours. In one embodiment, the duration of drying may range from about 2 hours to about 6 hours.

For adjusting the pH, the nut waste component including nut waste hulls, nut waste shells, or a combination of nut waste hulls and nut shells is contacted with an aqueous solution of a proton acceptor or water and a solid proton acceptor. A pH of a mixture of the nut waste component and water is adjusted to a range of about 5.5 to about 8.0, or about 6.5 to about 7.0.

The nut waste component is initially contacted with water forming a slurry. Once the slurry is prepared, a proton acceptor is contacted to the nut waste slurry. The proton acceptor may be a solid, a concentrated aqueous solution, or a dilute aqueous solution. After the addition is complete, the pH of the nut waste component is adjusted using additional proton acceptor. Alternatively, the nut waste component is contacted with an aqueous solution of the proton acceptor. After the addition is complete, the pH of the nut waste component is adjusted using additional proton acceptor. The concentration of the aqueous proton acceptor may range from about 0.1M (moles/L) to about 20M.

The amount of water used in the preparation of the slurry depends the nut waste component used, the amount of the nut waste component, the ability to adequately stir the slurry, and the specific proton acceptor used to adjust the pH. The water may be deionized, distilled, or potable water.

In general, the amount of water (volume) to the nut waste component (weight) used in the slurry to adjust the pH may range from about 1:1 to about 100:1. In various embodiments, the amount of water (volume) to the amount of nut waste component (weight) used in the slurry may range from about 1:1 to about 100:1, from about 5:1 to about 80:1, from about 10:1 to about 60:1, or from about 20:1 to about 50:1. Once the slurry is prepared, the proton acceptor is then added to adjust the pH.

Numerous proton acceptors may be used in adjusting the pH of the slurry of the nut waste component and water. Generally, the proton acceptor may be inorganic in nature. Non-limiting examples of suitable inorganic proton acceptors include ammonia, sodium hydroxide, sheetassium hydroxide, calcium hydroxide, barium hydroxide, ammonia, cesium carbonate, sodium bicarbonate, sheetassium bicarbonate, sodium carbonate, sheetassium carbonate, calcium carbonate, sodium borate, sodium dihydrogen phosphate, disodium hydrogen phosphate, sodium methoxide, sodium tert-butoxide, sheetassium tert-butoxide, sodium acetate, and sheetassium acetate. The amount of the proton acceptor used depends on the initial pH of the nut waste component.

The pH of the slurry of the nut waste component and water is adjusted to a range of 5.5 to 8.0. In various embodiments, the pH of the nut waste hulls, the nut waste shells, or a combination of the nut waste hulls and nut waste shells is adjusted to a range of 5.5 to 8.0, or 6.5 to 7.0 utilizing the proton acceptor. The pH of the slurry is measured through means as disclosed in the arts, such as a pH meter, litmus paper, or an inline pH device.

After completion of the pH adjustment, the pH adjusted nut waste hulls, the nut waste shells, or a combination of the nut waste hulls and nut waste shells and water is filtered through means known in the art to remove excess water for example but not limited to gravity filtration or centrifugation and may be washed with additional water one or more times. The water used in this washing may be distilled water, deionized water, or sheetable water.

The pH adjusted nut waste hulls, the nut waste shells, or a combination of the nut waste hulls and nut waste shells may be then dried. Depending on the temperature of drying, the nut waste hulls, the nut waste shells, or a combination of the nut waste hulls and nut waste shells may be dried or dried and sterilized. This step removes excess water or removes excess water and eliminates unwanted fungus and bacterium; or removes excess water, For drying, the pH adjusted nut waste component is contacted with heat. The drying may further comprise utilizing an inert atmosphere such as helium or nitrogen and may utilize reduced pressure (vacuum).

The temperature for drying the nut waste component may range from about 100° C. to about 150° C. In various embodiments, the temperature of drying may range from 100° C. to about 150° C., from about 120° C. to about 140° C., or from about 125° C. to about 130° C. An inert atmosphere, reduced pressure (vacuum), or a combination of inert atmosphere and reduced pressure may be also utilized in drying the nut waste component. The inert atmosphere may be helium, nitrogen, argon, or a combination thereof.

The duration of drying depends on the residual water content, the amount of nut waste component that needs to be dried, and the target residual water in the nut waste component. Generally, the target water content in the dried nut waste component is less than 0.5 wt%. In various embodiments, the nut waste component has a residual moisture content of less than 0.5 wt% water, less than 0.4% water, less than 0.3% water, less than 0.2% water, or less than 0.1% water. In one embodiment, the nut waste component has a residual water content of less than 0.1 wt%.

Generally, the duration of drying may range from about 1 hour to about 48 hours. In various embodiments, the duration of drying may range from about 1 hour to about 48 hours, from about 4 hours to 24 hours, or from about 12 hours to about 16 hours.

Sterilization removes excess water but also removes, kills, or deactivates all forms of life (in particular referring to microorganisms such as fungi, bacterium, viruses, spores, unicellular eukaryotic organisms such as Plasmodium, etc.) and other biological agents like prions present in the nut waste hull and nut shell. The sterilization temperature for drying the nut waste component may range from about 100° C. to about 150° C. Sterilization may utilize an autoclave, dry heat sterilization, and further utilize a chemical agent such as ethylene oxide, nitrogen dioxide, ozone, and hydrogen peroxide.

The nut waste composite is cooled to room temperature. The cooled nut waste component allows for a well dispersed heterogeneous mixture with one or more binders.

(c) grinding the size of the pH adjusted nut waste component

The next step in the method, step (d), comprises adjusting the size of the pH adjusted nut waste component from step (c). This method step consists of grinding, milling, crushing and/or separating the dried nut waster component from step (c) to achieve a specific size of the nut waste component. A solid mesh sieve is additionally used to ensure the nut waste component is in the appropriate size range., such as a No. 18 mesh sieve and a No. 35 mesh sieve. The size of the nut waste component after grinding, milling, crushing and/or separating may be greater than 500 µm to less than 1000 µm.

(d) contacting the nut waste component from step (d), one or more binders

The next step, step (e), in the method consists of contacting nut waste component from step (d) with one or more binders. The addition of the one or more binders in the nut waste sheet composite may occur in portions, or all at once. During this contacting step, the mixture of the nut waste component and one or more binders is stirred or mixed using methods known in the art, such as, but not limited to mechanical mixing (such as a batch mixer), a mechanical stirring, magnetic stirring, or a compounder (such as a kneading compounder) to ensure the mixture is adequately dispersed.

(e) heating the mixture from step (d)

The next step in the method comprises heating the components from step (d). This step in the method prepares a malleable pre-composite where the hydroxyl functionality of the cellulose, hemicellulose, and lignin react with one or more binders to form an extended polymer network. By maintaining the malleable pre-composite at an elevated temperature, the malleable pre-composite may be extruded, injection molded, compression molded, air injected, molded, pressed, thermoformed, or other means known in the art to form numerous shapes or numerous forms. As described above, step (e) and step (f) may occur in a single continuous process.

The temperature of heating the components from step (e) may range from about 80° C. to about 190° C. In various embodiments, the temperature of drying may range from about 80° C. to 190° C., from 100° C. to about 175° C., or about 125° C. to about 150° C. In one embodiment, temperature of heating the components from step (e) may range from about 90° C. to about 120° C.

In general, the duration of heating the mixture from step (f) may range from about 1 minute to about 1 hour. In various embodiments, the duration of heating the mixture from step (d) may range from about 1 minute to about 1 hour, from about 5 minutes to 45 minutes, or from about 10 minutes hours to about 30 minutes. In one embodiment, the duration of heating the mixture from step (d) is about 5 minutes.

With the incorporation of the nut waste component into the composite, the nut waste composite acts a plasticizer. The nut waste composite is softer and more flexible as compared to plastic materials yet provides increased durability and rigidity upon cooling. During the preparation of the nut waste composite, the nut waste component increases the plasticity of the composite, decreases the viscosity and friction as measured by a reduced amount of torque necessity for compounding, extruding, molding, or thermoforming. This property allows for the preparation of a variety of forms, shapes, and articles in various shapes and sizes.

(f) extruding, molding, or thermoforming the heated mixture from step (e) into a sheet form The next step in the process, step (g), comprises extruding, molding, or thermoforming the heated mixture from step (f) into a sheet form. The sheet form from the extruding, molding, or thermoforming process may of various sizes, various shapes, various thicknesses, and various depths.

Steps (d) through (f), may be also performed in a continuous manner. Thus, the nut waste component may be contacted with one or more binders; heating the mixture of the nut waste component and one or more binders; and then extruding, molding, or thermoforming the composite in various shapes such as pellets, granules, disks, and flakes for example.

(g) cooling the sheet form to form the cured nut waste sheet composite

The final step in the method, step (g), is to allow the form from step (f) to initially cool to about 50° C. to about 100° C. At this temperature range, the malleable pre-composite can be readily formed into various shapes. Some non-limiting examples of suitable forms or shapes are not limited to viscous liquid resins, solid resins, pellets, flakes, disks, sheets, wafers, or ribbons. The malleable pre-composite extruded, air injected, compressed, and molded into numerous shapes, or forms. Some non-limiting examples of these shapes and forms may be a sheet, a sheet, or a sheet. Once these shapes are formed and cooled to room temperature, a durable form in prepared. In some embodiments, the viscous liquid resins, solid resins, pellets, flakes, disks, wafers, or ribbons may be heated again to form a malleable pre-composite and then extruded, molded, compressed, or thermoformed. In this embodiment, these the viscous liquid resins, solid resins, pellets, flakes, disks, wafers, or ribbons can be prepared at a manufacturing facility, transported to a molding facility or onsite to form the final formed composites.

(h) optionally contacting the composite with at least one fungus, at least one bacterium, or a combination of at least one fungus and one bacterium When the nut waste component is in the final form, the at least one fungus, at least one bacterium, or a combination of at least one fungus and one bacterium may be optionally added or applied to the pre-composite or the final composite. When the nut waste composite is either sterilized or pH adjusted and then sterilized, the composite does not contain at least one fungus, at least one bacterium, or a combination of at least one fungus and one bacterium. In this case, the at least one fungus, at least one bacterium, or a combination of at least one fungus and one bacterium may be optionally added. The cured nut waste composite would naturally biodegrade especially in contact with water and is considered biocompostable. A list of suitable fungi and bacteria are detailed above in Section (I). The at least one fungus, at least one bacterium, or a combination of at least one fungus and one bacterium may be introduced using numerous methods known in the art. Non-limiting methods may be spraying an aqueous solution of at least one fungus, at least one bacterium, or a combination of at least one fungus and one bacterium or painting an aqueous solution of at least one fungus, at least one bacterium, or a combination of at least one fungus and one bacterium onto the composite or inoculating the composite.

(III) Methods of Using the Nut Waste Sheet Composite

The present disclosure also encompasses methods of using the cured nut waste composite. The cured nut waste composite can be casted, blow molded (using air or an inert gas such as extrusion blow molding, injection blow molding, injection stretch blow molding), extrusion molded, injection molded, matrix molded, molded, and thermoformed into various products as plastics. Some non-limiting examples of suitable forms or shapes are not limited to viscous resins, solid resins, pellets, flakes, disks, wafers, ribbons, sheets, sheets, and sheets.

Some of these forms or shapes of the nut waste composites may be further made malleable using heat and transformed into a variety of end products. Some non-limiting examples of suitable end products produced from the cured nut composite may be carpet underlayment, flooring, insulation, shipping containers for wine and other items, biotechnology, genetic engineering, organ procurement, diagnostic testing to pharmaceutical distribution, modular roofing and landscaping trays currently used in the building and landscape construction industry, biodegradable flower pots, seed pots, lids for cups, as well as many others.

In one embodiment, the end product is a sheet. These sheets can be used in the horticulture industry such as sheet mulch building industry such as floor underlayment, carpet underlayment, rigid insulation, roof underlayment, and modular roofing.

FIG. 1, FIG. 2, FIG. 3, and FIG. 4 shows examples of various pot produced using the nut waste composite.

Figure 5:
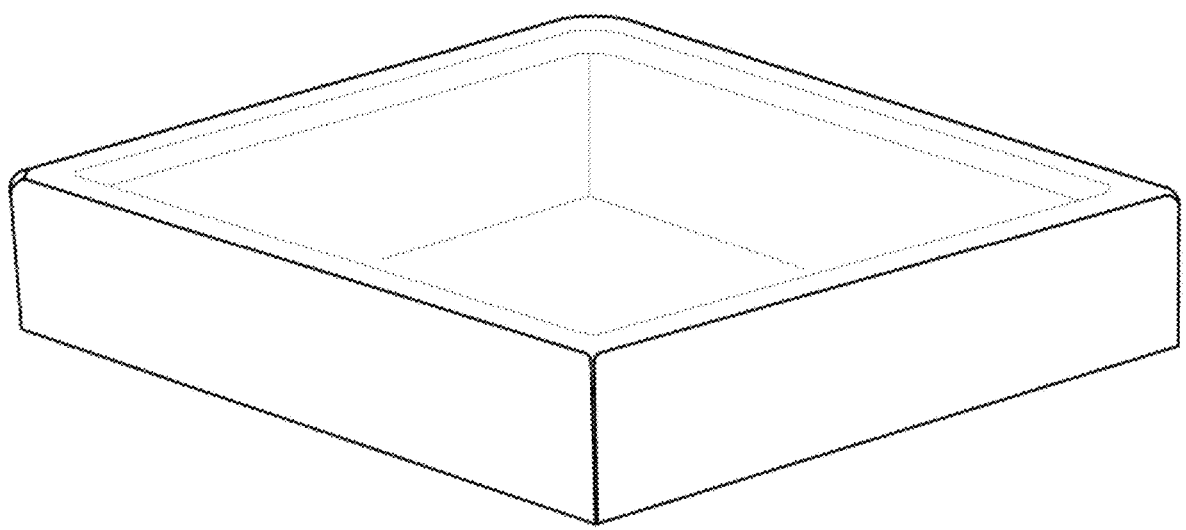
FIG. 5 is a graphical representation of a tray produced from the nut waste composite.
Figure 6:
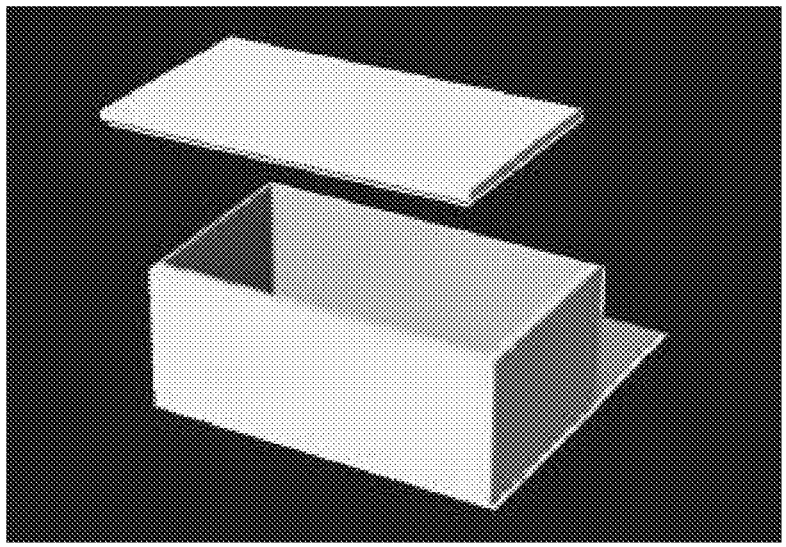
FIG. 6 shows shipping container produced using the nut waste composite.

FIG. 5 shows a tray produced from the nut waste composite. FIG. 6 shows shipping container produced using the nut waste composite.

DEFINITIONS

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The word "about: is intended to mean ±5% of the value.

As various changes could be made in the above-described methods without departing from the scope of the invention, it is intended that all matter contained in the above description and in the examples given below, shall be interpreted as illustrative and not in a limiting sense.

EXAMPLES

Example 1

Into a drying oven equipped with a nitrogen purge was placed 100 g of almond shells. The oven temperature was raised to ~100° C. (220° F.) for 3 hours until the almond shells felt consistently dried to the touch. The shells were then introduced into a grinder and blended at maximum power for 30 seconds. The almond shells powder from the grinder was sifted through a No. 18 mesh sieve and then through a No. 35 mesh sieve. The almond shell powder remaining in the No. 35 mesh sieve was collected to be used in the sheet composite. The powder which passed through the No. 35 mesh sieve was collected and used as a dust to prevent sticking of composite.

60 g of dried ground almond shells were then added into a kneading compounder. To the ground almond shells was added 40 g DRC (dry rubber content) natural rubber latex. The kneading compounder was initiated, and the mixture was kneaded for 10 minutes. The material was then extruded into sheets as a pre-composite.

The material as extruded sheets from the kneading compounder were then pressed with calendaring rollers at 167 PSI to a sheet, ⅛". These sheets were dried at 110° C. to cure the pre-composite but also to remove excess water for 3 minutes. After drying, the sheets were dusted with the almond dust obtained previously from the No. 35 mesh sieve to prevent the sheets from sticking during rolling.

The obtained composite sheets from the process can be cut into various shapes using a standard rubber die cutter. The obtained composite sheets can also be modified with holes using standard rubber puncture stamps.

What is claimed is:

1. A cured nut waste sheet composite, the cured nut waste sheet composite is prepared by the following steps:
    (a) providing a nut waste component selected from the group consisting of nut shells, nut hulls, and a combination of nut shells and nut hulls;
    (b) drying the nut waste component or adjusting the nut waste component to a pH of 5.0 to 8.0 then drying or sterilizing the nut waste component;
    (c) grinding the nut waste component to a size ranging from about greater than 500 μm to less than about 1000 μm;
    (d) contacting the nut waste component from step (c) with at least one or more binders selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof wherein the mixture in step (d) consists of about 5 wt% to 40 wt% of the nut waste component and 60.0 to 95.0 wt% of the binder;
    (e) heating the mixture to a temperature from about 80° C. to about 190° C. for about 5 minutes;
    (f) extruding the heated mixture into a sheet form; and
    (g) cooling the sheet wherein the cured nut waste sheet composite exhibits a thermal conductivity ranging from about 0.25 $Wm^{-1}K^{-1}$ to about 0.275 $Wm^{-1}K^{-1}$ at 23° C., a density from about 0.5 g/mL to about 0.75 g/mL, a Hardness from about 15 Konig to about 25 Konig, an Ultimate Tensile Strength from about 0.5 MPa to about 0.6 MPa, a Maximum Strain from about 263 to about 445, and an Elastic Modulus from about 0.053 MPa to about 0.057 MPa.

2. The cured nut waste sheet composite of claim 1, wherein the pH of the nut waste component ranges from about 6.5 to about 7.0.

3. The cured nut waste sheet composite of claim 1, wherein the nut waste component comprises mixtures of cellulose, hemicellulose, and lignin.

4. The cured nut waste sheet composite of claim 1, wherein the temperature of step (e) ranges from about 90° C. to about 120° C.

5. The cured nut waste sheet composite of claim 1, wherein the cured nut waste sheet composite exhibits percolation rate ranging from about 3.75 $Lm^{-2}s^{-1}$ to about 4.00 $Lm^{-2}s^{-1}$ for sheet composites with 2.5 mm diameter holes spaced 5 mm apart.

6. A cured nut waste sheet composite, the cured nut waste sheet composite is prepared by the following steps:
    (a) providing a nut waste component selected from the group consisting of nut shells, nut hulls, and a combination of nut shells and nut hulls;
    (b) drying the nut waste component or adjusting the nut waste component to a pH of 5.0 to 8.0 then drying or sterilizing the nut waste component;
    (c) grinding the nut waste component to a size ranging from about greater than 500 μm to less than about 1000 μm;
    (d) contacting the nut waste component from step (c) with of at least one or more binders selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof wherein the mixture in step (d) consists of about 40 wt% to 70 wt% of the nut waste component and 30.0 to 60.0 wt% of the binder;
    (e) heating the mixture to a temperature from about 80° C. to about 190° C. for about 5 minutes;
    (f) extruding the heated mixture into a sheet form; and
    (g) cooling the sheet wherein the cured nut waste sheet composite exhibits a thermal conductivity ranging from about 0.25 $Wm^{-1}K^{-1}$ to about 0.275 $Wm^{-1}K^{-1}$ at 23° C., a density from about 0.5 g/mL to about 0.75 g/mL, a Hardness from about 15 Konig to about 25 Konig, an Ultimate Tensile Strength from about 0.5 MPa to about 0.6 MPa, a Maximum Strain from about 263 to about 445, and an Elastic Modulus from about 0.053 MPa to about 0.057 MPa.

7. The cured nut waste sheet composite of claim 6, wherein the pH of the nut waste component ranges from about 6.5 to about 7.0.

8. The cured nut waste sheet composite of claim 6, wherein the nut waste component comprises mixtures of cellulose, hemicellulose, and lignin.

9. The cured nut waste sheet composite of claim 6, wherein the temperature of step (e) ranges from about 90° C. to about 120° C.

10. The cured nut waste sheet composite of claim 6, wherein the cured nut waste sheet composite exhibits percolation rate ranging from about 3.75 $Lm^{-2}s^{-1}$ to about 4.00 $Lm^{-2}s^{-1}$ for sheet composites with 2.5 mm diameter holes spaced 5 mm apart.

11. A cured nut waste sheet composite, the cured nut waste sheet composite is prepared by the following steps:
    (a) providing a nut waste component selected from the group consisting of nut shells, nut hulls, and a combination of nut shells and nut hulls;
    (b) drying the nut waste component or adjusting the nut waste component to a pH of 5.0 to 8.0 then drying or sterilizing the nut waste component;
    (c) grinding the nut waste component to a size ranging from about greater than 500 μm to less than about 1000 μm;
    (d) contacting of the nut waste component from step (c) with of at least one or more binders selected from a group consisting of polyhydroxybutyrate (PHB), polyhydroxyalkanoate (PHA), polylactic acid (PLA), guayule, natural rubber latex, bentonite, an anionic starch, hyaluronic acid, triethyl citrate, and combinations thereof wherein the mixture in step (d) consists of about 70 wt% to 95 wt% of the nut waste component and 5.0 to 30.0 wt% of the binder;

(e) heating the mixture to a temperature from about 80° C. to about 190° C. for about 5 minutes;

(f) extruding the heated mixture into a sheet form; and (g) cooling the sheet wherein the cured nut waste sheet composite exhibits a thermal conductivity ranging from about 25 $Wm^{-1}K^{-1}$ to about 0.275 $Wm^{-1}K^{-1}$, a density from about 0.5 g/mL to about 0.75 g/mL, a Hardness from about 15 Konig to about 25 Konig, an Ultimate Tensile Strength from about 0.5 MPa to about 0.6 MPa, a Maximum Strain from about 263 to about 445, and an Elastic Modulus from about 0.053 MPa to about 0.057 MPa.

12. The cured nut waste sheet composite of claim 11, wherein the pH of the nut waste component ranges from about 6.5 to about 7.0.

13. The cured nut waste sheet composite of claim 11, wherein the nut waste component comprises mixtures of cellulose, hemicellulose, and lignin.

14. The cured nut waste sheet composite of claim 11, wherein the temperature of step (e) ranges from about 90° C. to about 120° C.

15. The cured nut waste sheet composite of claim 11, wherein the cured nut waste sheet composite exhibits percolation rate ranging from about 3.75 $Lm^{-2}s^{-1}$ to about 4.00 $Lm^{-2}s^{-1}$ for sheet composites with 2.5 mm diameter holes spaced 5 mm apart.

\* \* \* \* \*